US010988689B2

(12) United States Patent
Moloney et al.

(10) Patent No.: US 10,988,689 B2
(45) Date of Patent: Apr. 27, 2021

(54) CORROSION INHIBITOR COMPOSITIONS AND METHODS OF USING SAME

(71) Applicant: ChampionX USA Inc., Sugar Land, TX (US)

(72) Inventors: Jeremy Moloney, Katy, TX (US); Prakasa Rao Anantaneni, Richmond, TX (US)

(73) Assignee: ChampionX USA Inc., Sugar Land, TX (US)

( * ) Notice: Subject to any disclaimer, the term of this patent is extended or adjusted under 35 U.S.C. 154(b) by 185 days.

(21) Appl. No.: 16/174,913

(22) Filed: Oct. 30, 2018

(65) Prior Publication Data

US 2019/0127640 A1    May 2, 2019

Related U.S. Application Data

(60) Provisional application No. 62/580,036, filed on Nov. 1, 2017.

(51) Int. Cl.
| | | |
|---|---|---|
| *C09K 15/28* | (2006.01) | |
| *C23F 11/14* | (2006.01) | |
| *C09K 8/54* | (2006.01) | |

(52) U.S. Cl.
CPC ............... *C09K 15/28* (2013.01); *C09K 8/54* (2013.01); *C23F 11/145* (2013.01); *C09K 2208/32* (2013.01)

(58) Field of Classification Search
CPC ...... C09K 15/28; C09K 8/54; C09K 2208/32; C23F 11/145
See application file for complete search history.

(56) References Cited

U.S. PATENT DOCUMENTS 2,477,327 A    7/1949    Blake
3,077,454 A    2/1963    Monroe et al.
(Continued)

FOREIGN PATENT DOCUMENTS

CN    107021890 A    8/2017
JP    5934531 A    2/1984
(Continued)

OTHER PUBLICATIONS

Zienty et al., "Base-Catalyzed Addition of Thiols to a,B-Unsaturated Anhydrides", Journal of Organic Chemistry, vol. 27 (9), 1962, pp. 3140-3146.
(Continued)

*Primary Examiner* — Pamela H Weiss
(74) *Attorney, Agent, or Firm* — Kagan Binder, PLLC

(57) ABSTRACT

Disclosed herein are sulfur-functional tall oil compositions, referred to herein as S-TO compositions. The S-TO is a sulfur-functional tall oil fatty amide composition, or sulfur-functional tall oil phosphate ester composition. Also disclosed herein are S-TO concentrates, which are stable and do not degrade to form $H_2S$ under standard storage conditions for a period of 1 day to 5 years. Also disclosed herein are treated water sources and treated metal containments including one or more S-TO compositions. The S-TO compositions inhibit corrosion of a metal containments contacted with one or more water sources, wherein the one or more water sources comprise one or more corrodents. The S-TO compositions are as effective or more effective at inhibiting corrosion than conventional sulfur-based corrosion inhibitors when compared on a weight basis.

13 Claims, 2 Drawing Sheets

(56) References Cited

U.S. PATENT DOCUMENTS

| | | | |
|---|---|---|---|
| 3,134,759 A * | 5/1964 | Kirkpatrick | C23F 11/145 |
| | | | 530/231 |
| 3,422,166 A | 1/1969 | Davis | |
| 3,650,978 A | 3/1972 | Chambers et al. | |
| 6,063,334 A | 5/2000 | Naraghi | |
| 10,000,641 B2 * | 6/2018 | Miles | C09K 8/54 |
| 10,301,553 B2 * | 5/2019 | Geissler | C02F 1/68 |
| 10,450,659 B2 * | 10/2019 | Moloney | C23F 11/10 |
| 10,457,817 B2 * | 10/2019 | Ekoue-Kovi | C10L 1/2443 |
| 10,519,360 B2 * | 12/2019 | Obeyesekere | C09K 8/54 |
| 10,604,710 B2 * | 3/2020 | Moloney | C23F 11/04 |
| 10,611,951 B2 * | 4/2020 | Obeyesekere | C23F 11/163 |
| 2013/0228095 A1 * | 9/2013 | Miles | C23F 11/141 |
| | | | 106/14.42 |
| 2014/0076567 A1 | 3/2014 | Meyer et al. | |
| 2015/0011453 A1 * | 1/2015 | Bennett | C11D 11/0041 |
| | | | 510/402 |
| 2016/0177226 A1 * | 6/2016 | Bennett | C10L 10/04 |
| | | | 507/243 |
| 2017/0342310 A1 * | 11/2017 | Obeyesekere | C23F 11/163 |
| 2017/0342311 A1 * | 11/2017 | Obeyesekere | C09K 8/54 |

FOREIGN PATENT DOCUMENTS

| | | | |
|---|---|---|---|
| WO | 01/12878 A1 | 2/2001 | |
| WO | 2009/006527 A1 | 1/2009 | |
| WO | 2009/097562 A1 | 8/2009 | |
| WO | WO-2016092011 A1 * | 6/2016 | C09K 8/54 |

OTHER PUBLICATIONS

International Search Report for International Application No. PCT/US2018/058176, dated Jan. 24, 2019, 6 pages.

Written Opinion for International Application No. PCT/US2018/058176, dated Jan. 24, 2019, 7 pages.

* cited by examiner

CORROSION INHIBITOR COMPOSITIONS AND METHODS OF USING SAME

FIELD OF THE INVENTION

The present invention generally relates to methods and compositions for improved corrosion inhibition of metal surfaces exposed to one or more corrodents present in water sources.

BACKGROUND

Aqueous liquids are injected into the earth and/or recovered from the earth during subterranean hydrocarbon recovery processes such as hydraulic fracturing (fracking) and tertiary oil recovery. In one or more such processes, an aqueous liquid called an "injectate" is injected into a subterranean formation. Injectates include water and entrained solids and/or solvents therein. In one or more such processes a water source called "produced water" is recovered, i.e. flows back from the subterranean formation and is collected along with a hydrocarbon product. Produced water includes one or more of injectate, connate (native water present in the subterranean formation along with the hydrocarbon), sea water, and hydrocarbon liquids or solids entrained (dispersed, emulsified, or dissolved) therein. In some embodiments, one or more of the injectate and the produced water includes one or more corrodents such as salts and/or other dissolved solids, liquids, or gases that cause, accelerate, or promote corrosion of metal containments such as metal pipelines used to transport the produced water toward, into, out of, or away from a subterranean formation, metal tanks used to hold the water sources for a period of time, and/or other metal equipment or devices that contact the water sources before, during, or after injection or production. Non-limiting examples of such corrodents are carbon dioxide, oxygen, sodium chloride, calcium chloride, and sulfur dioxide.

Almost all operators in the oil and gas extraction and processing industry employ corrosion inhibitors to reduce internal corrosion in metal containments which are contacted by aqueous liquids containing corrodents. Corrosion inhibitors are added to the liquids and dissolved gasses which come into contact with metal surfaces where they act to prevent, retard, delay, reverse, and/or otherwise inhibit the corrosion of metal surfaces such as carbon-steel metal surfaces. In some cases one or more corrosion inhibitors are added to a water source, such as an injectate and/or a produced water; optionally, other additives such as polymers, surfactants, scale inhibitors, paraffin inhibitors, metal complexing agents, and the like are added along with the corrosion inhibitor or are present in the water source to which the corrosion inhibitor is applied. Such corrosion inhibitors are beneficial in that they permit the use of carbon steel components rather than the much more expensive high nickel, cobalt, and chromium alloys or other materials either more expensive than carbon steel and/or which inherently entail other disadvantages in suitability for the purpose of liquid containment.

One useful class of corrosion inhibitors commonly employed in water sources arising from oil recovery processes are sulfur-based corrosion inhibitors. Conventional sulfur-based corrosion inhibitors include, for example, thioglycolic acid, 2-mercaptoethanol, and sodium thiosulfate. Sulfur-based corrosion inhibitors are known to be highly effective corrosion inhibitors and are favored in the industry because they are also inexpensive. However, some sulfur-based corrosion inhibitors are known to produce hydrogen sulfide ($H_2S$) gas when stored in an enclosed space for periods of time as short as 24 hours or even less at ambient temperatures such as about 20° C. This problem is exacerbated by storage of sulfur-based corrosion inhibitor concentrates, which may include up to 90 wt % of one or more sulfur-based corrosion inhibitors in a solution or dispersion. Conventional storage methods employed for these concentrates lead to substantial amounts of $H_2S$ gas buildup in the headspace of the containers holding such concentrates: in some embodiments, as much as 1000 ppm to 10,000 ppm $H_2S$ gas accumulates in the headspace of storage containers holding a sulfur-based corrosion inhibitor concentrate.

Hydrogen sulfide itself is a known corrodent recognized to cause severe corrosion issues in metal containments related to oil recovery operations. Hydrogen sulfide is toxic and dissolves in both hydrocarbon (oil/gasoline) and water streams. Further, where $H_2S$ is dissolved in such liquid streams it is also present as a flammable gas over the liquid streams, providing a severe health and safety risk.

The industry has recognized the hazards associated with $H_2S$ and has responded by development of $H_2S$ scavengers, which do not prevent degradation of sulfur-based corrosion inhibitors but rather adsorb or react with $H_2S$ to remove (scavenge) it from the systems where it becomes entrained. For example, triazines are known $H_2S$ scavengers. The scavenger approach is effective for eliminating naturally arising sources of $H_2S$, such as in natural gas, produced water, and the like. However, once a sulfur-based corrosion inhibitor is chemically degraded to release $H_2S$, the residue of the degraded sulfur-based corrosion inhibitor is no longer effective for its intended purpose.

Consequently, there is a need in the industry to prevent accumulation of $H_2S$ gas during storage of sulfur-based corrosion inhibitors and compositions containing sulfur-based corrosion inhibitors. There is a need in the industry for stabilized sulfur-based corrosion inhibitor compositions. And there is a need in the industry to improve the corrosion inhibition efficacy of such treatments beyond that of industry-standard sulfur-based corrosion inhibitor compositions.

SUMMARY OF THE INVENTION

Figure 1:
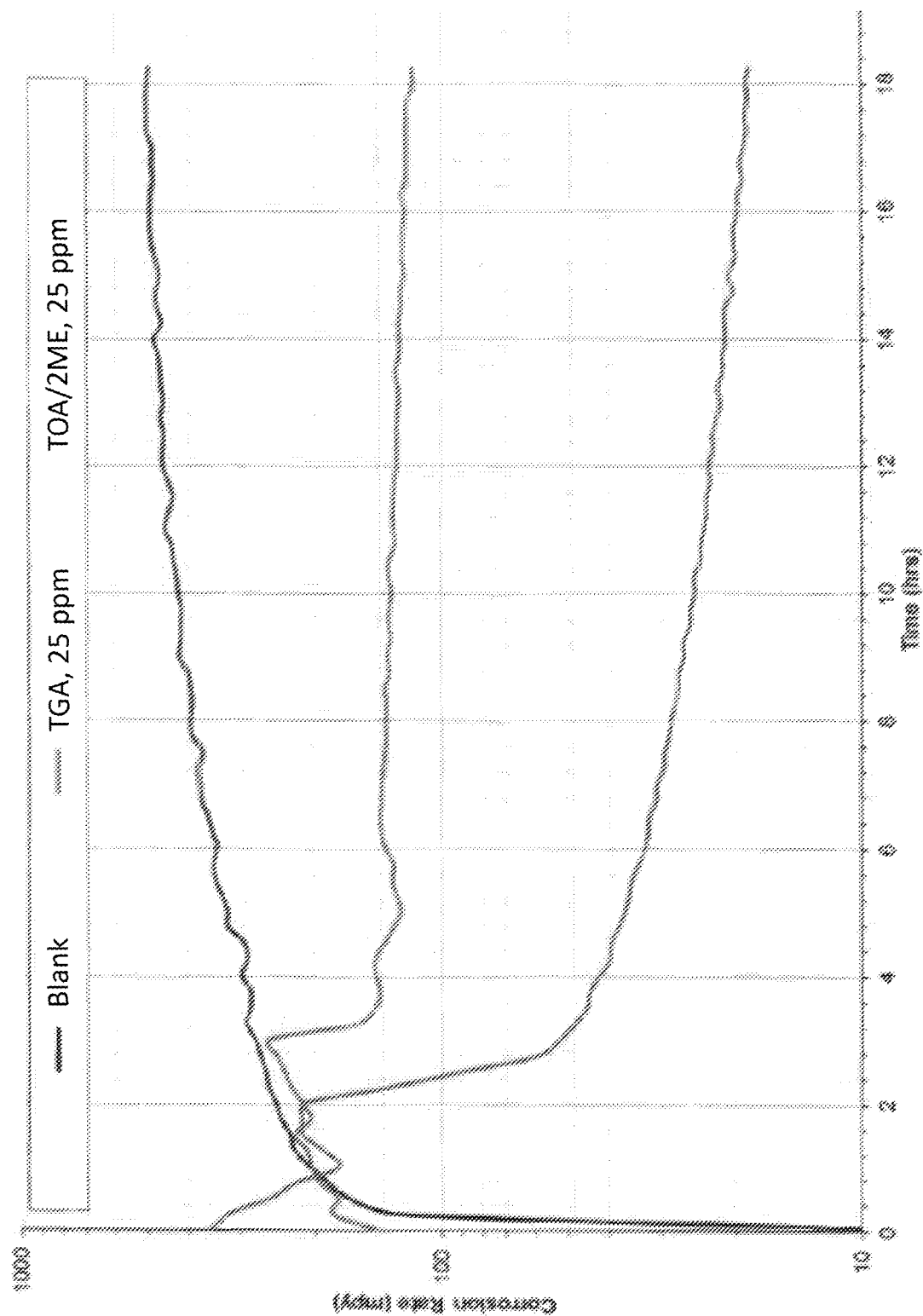
FIG. 1 is a plot of corrosion in milli-inches per year as a function of time for a composition described herein.

Disclosed herein are sulfur-functional tall oil compositions, referred to herein as S-TO compositions. The S-TO compositions inhibit corrosion of a metal containments contacted with one or more water sources, wherein the one or more water sources comprise one or more corrodents. The S-TO compositions are storage stable and do not result in $H_2S$ formation under storage conditions. The S-TO compositions are as effective or more effective than conventional sulfur-based corrosion inhibitors when compared on a weight basis.

The S-TO is a sulfur-functional tall oil fatty amide composition, or S-TOFAm. In embodiments, the S-TOFAm is a mixture of a tall oil fatty amide (TOFAm) with thioglycolic acid, 2-mercaptoethanol, sodium thiosulfate, or a combination of two or more thereof. In other embodiments, the S-TOFAm is a reaction product of a TOFAm with thioglycolic acid, 2-mercaptoethanol, sodium thiosulfate, or a combination of two or more thereof. In still other embodiments, the S-TOFAm is a mixture of TOFAm, one or more of thioglycolic acid, 2-mercaptoethanol, and sodium thiosulfate, and one or more reaction products of a TOFAm with thioglycolic acid, 2-mercaptoethanol, sodium thiosulfate, or a combination of two or more thereof.

In embodiments, a tall oil fatty amide composition (TO-FAm) is employed to form the S-TOFAm, wherein the TOFAm is the reaction product of a tall oil fatty acid (TOFA) with a primary amine. In embodiments, the primary amine further includes hydroxyl functionality. In embodiments the primary amine is 2-[(2-aminoethyl)amino]ethan-1-ol ("aminoethylethanolamine", or "AEEA"). In embodiments wherein the primary amine reacted with TOFA further includes hydroxyl functionality, the resulting TOFAm and S-TOFAm includes hydroxyl functionality and may be referred to herein as a hydroxylated TOFAm (TOFAm-OH) or hydroxylated S-TOFAm (S-TOFAm-OH).

In embodiments, the S-TO composition is a sulfur-functional tall oil phosphate ester composition, or S-TOFAm-P. In some embodiments TOFAm-OH or S-TOFAm-OH is further reacted with phosphoric acid to yield a mixture of phosphate esters of the TOFAm-OH or S-TOFAm-OH, in embodiments further including unreacted TOFAm-OH or S-TOFAm-OH. Such compositions are referred to herein as TOFAm-P or S-TOFAm-P, respectively. In embodiments, the TOFAm-P or S-TOFAm-P compositions further include TOFAm-OH or S-TOFAm-OH. In embodiments, S-TOFAm-P is a mixture of TOFAm-P with thioglycolic acid, 2-mercaptoethanol, sodium thiosulfate, or a combination of two or more thereof. In other embodiments, the S-TOFAm-P is a reaction product of a TOFAm-P with thioglycolic acid, 2-mercaptoethanol, sodium thiosulfate, or a combination of two or more thereof. In still other embodiments, the S-TOFAm-P is a mixture of TOFAm-P, one or more of thioglycolic acid, 2-mercaptoethanol, and sodium thiosulfate, and one or more reaction products of a TOFAm, TOFAm-OH, or both with thioglycolic acid, 2-mercaptoethanol, sodium thiosulfate, or a combination of two or more thereof.

Also disclosed herein are S-TO concentrates, which are compositions including about 1 wt % to 90 wt % of one or more S-TO and one or more cosolvents, polymers, surfactants, or combinations of two or more thereof. In some embodiments the concentrates include about 5 wt % to 25 wt % of one or more S-TO. In some embodiments the concentrates include two or more S-TO species. The S-TO concentrates are stable under standard storage conditions for at least two days and up to five years. Additionally, during storage of the S-TO concentrates under standard storage conditions for at least two years, $H_2S$ is not measurably released, as determined by storing the S-TO concentrates in containers under standard storage conditions, followed by headspace analysis of the storage containers for $H_2S$.

Also disclosed herein are treated water sources and treated metal containments including one or more S-TO compositions. A metal containment is a tank, pipe, or other apparatus having a metal surface in contact with a water source, wherein the water source includes one or more corrodents, for example one or more of hydrogen sulfide, carbon dioxide, oxygen, sodium chloride, calcium chloride, and sulfur dioxide. A treated containment is a metal containment comprising a treated water source contacting a metal surface or portion thereof. A treated water source comprises one or more corrodents and about 0.5 ppm to 500 ppm of one or more S-TO compositions. The S-TO compositions inhibit corrosion of the metal containment surface contacted by the water source. In embodiments, the water source is an industrial water source, such as a produced water or waste water from an industrial process. In embodiments the one or more corrodents include $H_2S$. In embodiments, the containment surface in contact with the water source includes a carbon steel surface. In embodiments, the water source is a continuously flowing water source, such as produced water flowing from a subterranean reservoir and into or through a pipe or tank, or wastewater isolated from a continuous manufacturing process flowing into a wastewater treatment apparatus. In other embodiments, the water source is a batch, or plug, substantially disposed in a batchwise or static state within the containment.

Also disclosed herein are methods of making S-TO compositions. In embodiments, a tall oil fatty acid (TOFA) is reacted with a primary amine in a molar ratio of about 1:1 to form TOFAm, followed by combining the TOFAm with thioglycolic acid, 2-mercaptoethanol, sodium thiosulfate, or a combination of two or more thereof in a molar ratio of 10:1 to 1:10 and heating the combination to form a S-TOFAm. That is, the ratio of amide functionality to sulfur is 10:1 to 1:10. In embodiments, the primary amine is water soluble. In embodiments, the primary amine further includes secondary amine functionality. In embodiments, the primary amine further includes hydroxyl functionality. In embodiments the primary amine is 2-[(2-aminoethyl)amino]ethan-1-ol, or AEEA. In embodiments, the heating is heating to a temperature sufficient to melt one or more of the combined components. In some embodiments, the primary amine has a boiling point of greater than 100° C., such as between 100° C. and 300° C.

In some embodiments wherein the primary amine further includes hydroxyl functionality, the method of making an S-TO further includes combining S-TOFAm-OH or TOFAm-OH with phosphoric acid in a molar ratio of 10:1 to 1:10 and heating the combination to form S-TOFAm-P or TOFAm-P, respectively. In some embodiments, the heating is heating to a temperature sufficient to melt one or more of the combined components.

Also disclosed herein is a method of storing an S-TO composition, the method comprising combining 1 wt % to 90 wt % of one or more S-TO with one or more cosolvents, polymers, surfactants, or combinations of two or more thereof to form an S-TO concentrate; and storing the S-TO concentrate in an enclosed container for at least 24 hours and as long as five years. In some embodiments the S-TO concentrates include about 5 wt % to 25 wt % of one or more S-TO. In some embodiments the storage is between 0° C. and 100° C. During storage of the S-TO concentrates, $H_2S$ is not measurably released, as determined by headspace analysis of the storage containers.

DETAILED DESCRIPTION

Although the present disclosure provides references to preferred embodiments, persons skilled in the art will recognize that changes may be made in form and detail without departing from the spirit and scope of the invention. Reference to various embodiments does not limit the scope of the claims attached hereto. Additionally, any examples set forth in this specification are not intended to be limiting and merely set forth some of the many possible embodiments for the appended claims.

Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

As used herein, the term "water source" means a liquid comprising water and one or more corrodents. In embodiments, the water source comprises, consists essentially of, or consists of wastewater from one or more industrial processes. In embodiments, the water source comprises, consists essentially of, or consists of produced water. In embodiments, the amount of the one or more corrodents in the water source is sufficient to corrode a carbon steel at a rate of at least 100 milli-inches per year, and in embodiments as much as 1000 milli-inches per year.

As used herein, the term "produced water" means a water source that flows from a subterranean formation in a hydrocarbon recovery process such as hydraulic fracturing or tertiary oil recovery, further wherein the water source includes one or more hydrocarbons, one or more dissolved solids, or a combination thereof.

As used herein, the term "corrodent" means salts and/or other dissolved solids, liquids, or gasses that cause, accelerate, or promote corrosion, further wherein the corrodent is dissolved or dispersed in a water source. Non-limiting examples of corrodents are hydrogen sulfide, hydrogen chloride, carbon dioxide, oxygen, sodium chloride, calcium chloride, and/or sulfur dioxide.

As used herein, the term "container" means a discrete article having an interior volume and means to enclose a liquid therein, wherein "enclose" means substantially isolate the liquid from the ambient atmosphere and from fluid communication. Means to enclose include one or more of caps, valves, lids, covers, plugs, stoppers, doors, or other conventional means known to those of skill to enable enclosing a liquid within the interior volume. In embodiments, the interior volume of the container enclosing the liquid includes a headspace volume comprising a gas.

As used herein, the term "storage conditions" generally refers to the conditions surrounding or proximal to a container and that affect the temperature and/or pressure of the enclosed contents of the container. Such conditions include ambient temperature and pressure, contact of the exterior container with direct sunlight, and the like. In embodiments the storage conditions cause temperature and pressure within the container to vary during the storage period, wherein the storage period is two days to five years.

As used herein, the term "standard storage conditions" means storage conditions wherein the temperature proximal to the container is −40° C. and 70° C.

As used herein, the term "stable" or "storage stable" means that after at least two days of storage under standard storage conditions, and as long as 5 years no $H_2S$ is measured in the headspace of a container having a material or composition enclosed therein.

As used herein, the term "containment" or "metal containment" means an apparatus having a metal surface or portion thereof in contact with a water source, wherein the water source includes one or more corrodents. In embodiments the containment is in fluid communication with one or more devices or apparatuses. In embodiments the containment is a pipe. In embodiments the containment is a tank. In embodiments, the metal is carbon steel.

The terms "comprise(s)", "include(s)", "having", "has", "can", "contain(s)", and variants thereof, as used herein, are intended to be open-ended transitional phrases, terms, or words that do not preclude the possibility of additional acts or structures. The singular forms "a", "and", and "the" include plural references unless the context clearly dictates otherwise. The present disclosure also contemplates other embodiments "comprising", "consisting of" and "consisting essentially of", the embodiments or elements presented herein, whether explicitly set forth or not.

As used herein, the term "optional" or "optionally" means that the subsequently described component, event or circumstance may but need not be present or occur. The description therefore discloses and includes instances in which the event or circumstance occurs and instances in which it does not, or instances in which the described component is present and instances in which it is not.

As used herein, the term "about" modifying, for example, the quantity of an ingredient in a composition, concentration, volume, temperature, time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, through standard operating machine error, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents according to this definition. Further, where "about" is employed to describe a range of values, for example "about 1 to 5" the recitation means "1 to 5" and "about 1 to about 5" and "1 to about 5" and "about 1 to 5" unless specifically limited by context.

As used herein, the term "substantially" means "consisting essentially of", as that term is construed in U.S. patent law, and includes "consisting of" as that term is construed in U.S. patent law. For example, a solution that is "substantially free" of a specified compound or material may be free of that compound or material, or may have a minor amount of that compound or material present, such as through unintended contamination or incomplete purification. A "minor amount" may be a trace, an unmeasurable amount, an amount that does not interfere with a value or property, or some other amount as provided in context. A composition that has "substantially only" attached to a provided list of components may consist of only those components, or have a trace amount of some other component present, or have one or more additional components that do not materially affect the properties of the composition. Additionally, "substantially" modifying, for example, the type or quantity of an ingredient in a composition, a property, a measurable quantity, a method, a value, or a range, employed in describing the embodiments of the disclosure, refers to a variation that does not affect the overall recited composition, property, quantity, method, value, or range thereof in a manner that negates an intended composition, property, quantity, method, value, or range. Where modified by the term "substantially" the claims appended hereto include equivalents according to this definition.

Discussion

Disclosed herein are sulfur-functional tall oil compositions, or S-TO compositions. The S-TO are based on derivatives and reaction products of tall oil fatty acid (TOFA). The term "tall oil fatty acid" or "TOFA" refers to a combination of mono- or polyunsaturated long-chain carboxylic acids derived from sources comprising, consisting essentially of, or consisting of "tall oil". "Tall oil" is a term of art for the by-product obtained from a Kraft process of wood pulp manufacture, most commonly from pulping coniferous trees. In the Kraft Process, high alkalinity and temperature converts the esters and carboxylic acids in tree rosin into soluble sodium salts thereof that are referred to as "soaps". The soaps are collected, then heated and acidified with sulfuric acid to recreate the free acids; this product is referred to as crude tall oil (CTO). Fractional distillation of CTO yields the product known in the industry as TOFA.

TOFA is an industrially useful material that is derived from natural sources and therefore in embodiments includes more than one species of fatty acid. In embodiments, both the type and amount of different fatty acids in a TOFA material vary between batches. Thus, both TOFA and any reaction products thereof as described herein represent a range of chemical species. Thus, in embodiments, references herein to S-TO "species" refers to TOFA employed as a starting material to make the S-TO disclosed herein, and therefore the reaction products or mixtures thereof described herein as including more than one S-TO chemical species corresponding to the more than one TOFA species.

Since they are derived from natural materials, TOFA and derivatives thereof as discussed herein have a compositional range that varies based on the specific trees from which the tall oil product is initially obtained as well as the extent of subsequent processing thereof, particularly the fractionation of CTO. In some embodiments, the major component (50% or more by weight) of TOFA is oleic acid ((9Z)-octadec-9-enoic acid, $CH_3(CH_2)_7CH=CH(CH_2)_7COOH$).

In embodiments, the S-TO compositions include, consist essentially of, or consist of a hydroxylated sulfur-functional tall oil fatty acid amide composition (S-TOFAm). In embodiments, the S-TO compositions include, consist essentially of, or consist of a sulfur-functional tall oil phosphate ester composition (S-TOFAm-P). In embodiments, the S-TO compositions include, consist essentially of, or consist of or a combination of two or more of the foregoing S-TO compositions. Unless otherwise specified or determined by context, "S-TO compositions" refers to S-TOFAm, S-TOFAm-OH, and S-TOFAm-P compositions collectively or interchangeably. Unless otherwise specified or determined by context, the properties, methods of making, and performance of "S-TO compositions" described herein refers to properties, methods of making, and performance of S-TOFAm, S-TOFAm-OH, and S-TOFAm-P collectively or interchangeably.

In embodiments, a tall oil fatty amide composition (TOFAm) is a primary amide, that is, an amide formed by the reaction of a carboxylic acid with a primary amine. TOFAm is a starting material employed to form the S-TO. TOFAm is the reaction product of a tall oil fatty acid (TOFA) with a primary amine. Thus, in embodiments, a primary amine is reacted with TOFA to form TOFAm. In embodiments, the primary amine is water soluble. In embodiments, the primary amine further includes secondary amine functionality. In embodiments, the primary amine further includes hydroxyl functionality. In some embodiments, the primary amine has a boiling point of greater than 100° C., such as between 100° C. and 300° C. In embodiments the primary amine is ethanolamine. In embodiments the primary amine is 2-[(2-aminoethyl)amino]ethan-1-ol ("aminoethylethanolamine", or AEEA). In embodiments the primary amine is a mixture of two or more primary amines.

The reaction to form TOFAm is generally conducted using approximately a 1:1 molar ratio of TOFA to primary amine, although the molar ratio may be suitably varied between about 1.5:1 to 1:1.5. The reaction is carried out by contacting the components, optionally including heating the contacted components. Optionally the combination of contacted components further includes one or more solvents. The contacting is continued until substantially complete, that is, the 1:1 amide reaction product of the TOFA and the primary amine is formed. The formation of TOFAm is suitably verified using common analysis methods such as liquid chromatography or thin layer chromatography. In embodiments, the TOFAm reaction product is employed without further purification or other steps as an intermediate in the formation of S-TO.

In embodiments, the TOFAm have the structure R—C(O)NH—R', in which R denotes a tall oil fatty group (having variable species as noted above) and R' denotes a group including 1 to 4 carbon atoms and optionally one or more hydroxyl or secondary amino functionalities.

In embodiments the TOFAm is a TOFAm-OH, that is, a TOFAm bearing at least one hydroxyl functionality. In embodiments wherein the primary amine reacted with TOFA further includes hydroxyl functionality, the resulting TOFAm includes hydroxyl functionality and may be referred to herein as a "hydroxylated TOFAm", or "TOFAm-OH". For general discussion purposes and unless specified or determined by context, TOFAm includes TOFAm-OH. The resulting S-TO also includes hydroxyl functionality and is referred to herein as "S-TOFAm-OH". For general discussion purposes and unless specified or determined by context, S-TOFAm includes S-TOFAm-OH.

First Embodiment of S-TO

In first embodiments, the S-TO is S-TOFAm. Thus, in first embodiments, TOFAm is used to form S-TOFAm, a first S-TO. In embodiments, the S-TOFAm is a S-TOFAm-OH. One method suitable to form S-TOFAm is contacting the TOFAm with thioglycolic acid, 2-mercaptoethanol, sodium thiosulfate, or a combination of two or more thereof in a molar ratio of 10:1 to 1:10; and heating the combination to form a S-TOFAm. In embodiments, the molar ratio of TOFAm to sulfur contacted is 1:10 to 10:1, or 1:9 to 10:1, or 1:8 to 10:1, or 1:7 to 10:1, or 1:6 to 10:1, or 1:5 to 10:1, or 1:4 to 10:1, or 1:3 to 10:1, or 1:2 to 10:1, or 1:1 to 10:1, or 1:10 to 9:1, or 1:10 to 9:1, or 1:10 to 8:1, or 1:10 to 7:1, or 1:10 to 6:1, or 1:10 to 5:1, or 1:10 to 4:1, or 1:10 to 3:1, or 1:10 to 2:1, or 1:10 to 1:1, or 1:9 to 9:1, or 1:8 to 8:1, or 1:7 to 7:1, or 1:6 to 6:1, or 1:5 to 5:1, or 1:4 to 4:1, or 1:3 to 3:1, or 1:2 to 2:1, or 1:1, or about 1:1. In embodiments, the heating is heating to a temperature sufficient to melt one or more of the contacted components. In embodiments, the heating is heating to a temperature of about 60° C. to 150° C., or about 60° C. to 120° C., or about 60° C. to 100° C. In some embodiments the contacting further includes adding a solvent while in other embodiments the contacting is neat (solventless). In embodiments, the solvent comprises, consists essentially of, or consists of a water soluble solvent or mixture thereof. In embodiments, the solvent comprises, consists essentially of, or consists of one or more $C_1$-$C_6$ alkanols, alkoxyalkanols, glycols, glycol ethers, and mixtures of two or more such solvents in any ratio. In some embodiments, the heating is continued for a period of about 1 minute to about 12 hours, or about 10 minutes to 10 hours, or about 30 minutes to 5 hours. In embodiments the heating is continued until one or more reaction products are detected, or until the reaction between the components is sufficient to provide optimal anti-corrosion activity of the resulting S-TO, as determined by the operator and further by optimization of reaction products for one or more specific containments, specific corrodents, or specific water sources, or a combination thereof.

Detecting the extent of the reaction to form an S-TO (including both first and second S-TOs as described herein) is easily accomplished using one or more common analytical methods known to the chemist of average skill. Representative but nonlimiting examples of such methods include liquid chromatography, gas chromatography, and thin layer chromatography. Such techniques are readily employed in monitoring any of the S-TO formation reactions or combinations described herein; it is a feature of the invention that the mixture components are easily blended and reactions between components easily monitored.

Thus, in first embodiments, the first S-TO comprises, consists essentially of, or consists of a mixture of a TOFAm with thioglycolic acid, 2-mercaptoethanol, sodium thiosulfate, or a combination of two or more thereof. In other embodiments, the first S-TO comprises, consists essentially of, or consists of a reaction product of a TOFAm with thioglycolic acid, 2-mercaptoethanol, sodium thiosulfate, or a combination of two or more thereof. In still other embodiments, the first S-TO comprises, consists essentially of, or consists of a mixture of TOFAm, one or more of thioglycolic acid, 2-mercaptoethanol, and sodium thiosulfate, and one or more reaction products of a TOFAm with thioglycolic acid, 2-mercaptoethanol, sodium thiosulfate, or a combination of two or more thereof. In embodiments, the first S-TO is or comprises S-TOFAm-OH.

Second Embodiment of an S-TO

In second embodiments, the S-TO is S-TOFAm-P. In such second embodiments, one of TOFAm-OH or S-TOFAm-OH is used as a starting material to form S-TOFAm-P, the second S-TO. In such embodiments, one or TOFAm-OH or S-TOFAm-OH are employed as starting materials and are further contacted with phosphoric acid. Such compositions are referred to herein as TOFAm-P or S-TOFAm-P, respectively. In embodiments the contacting phosphoric acid yields a mixture of phosphate esters of the TOFAm-OH or S-TOFAm-OH. In embodiments, the TOFAm-P or S-TOFAm-P compositions further include unreacted TOFAm-OH or S-TOFAm-OH.

A first method of forming the second S-TO includes contacting S-TOFAm-OH with phosphoric acid. S-TOFAm-OH and methods of making S-TOFAm-OH are described above. In embodiments, the contacting includes contacting in a molar ratio of 10:1 to 1:10; and heating the combination to form a S-TOFAm-P. In embodiments, the molar ratio of S-TOFAm-OH to phosphoric acid is 1:10 to 10:1, or 1:9 to 10:1, or 1:8 to 10:1, or 1:7 to 10:1, or 1:6 to 10:1, or 1:5 to 10:1, or 1:4 to 10:1, or 1:3 to 10:1, or 1:2 to 10:1, or 1:1 to 10:1, or 1:10 to 9:1, or 1:10 to 9:1, or 1:10 to 8:1, or 1:10 to 7:1, or 1:10 to 6:1, or 1:10 to 5:1, or 1:10 to 4:1, or 1:10 to 3:1, or 1:10 to 2:1, or 1:10 to 1:1, or 1:9 to 9:1, or 1:8 to 8:1, or 1:7 to 7:1, or 1:6 to 6:1, or 1:5 to 5:1, or 1:4 to 4:1, or 1:3 to 3:1, or 1:2 to 2:1, or 1:1, or about 1:1. In embodiments, the heating is heating to a temperature sufficient to melt one or more of the contacted components. In embodiments, the heating is heating to a temperature of about 60° C. to 150° C., or about 60° C. to 120° C., or about 60° C. to 100° C. In some embodiments the contacting further includes adding a solvent while in other embodiments the contacting is neat (solventless). Useful solvents include $C_3$-$C_6$ alkanols, alkoxyalkanols, glycols, glycol ethers, and mixtures of two or more such solvents in any ratio. In some embodiments, the heating is continued for a period of about 1 minute to about 12 hours, or about 10 minutes to 10 hours, or about 30 minutes to 5 hours. In embodiments the heating is continued until one or more reaction products are detected, or until the reaction between the components is sufficient to provide optimal anti-corrosion activity of the resulting S-TO, as determined by the operator and further by optimization of reaction products for one or more specific containments, specific corrodents, or specific water sources, or a combination thereof.

A second method of forming S-TOFAm-P (the second S-TO) includes contacting TOFAm-P with thioglycolic acid, 2-mercaptoethanol, sodium thiosulfate, or a combination of two or more thereof. TOFAm-P is formed by contacting a TOFAm-OH with phosphoric acid in a molar ratio of 10:1 to 1:10; and heating the combination to form TOFAm-P. In embodiments, the molar ratio of TOFAm-OH to phosphoric acid is 1:10 to 10:1, or 1:9 to 10:1, or 1:8 to 10:1, or 1:7 to 10:1, or 1:6 to 10:1, or 1:5 to 10:1, or 1:4 to 10:1, or 1:3 to 10:1, or 1:2 to 10:1, or 1:1 to 10:1, or 1:10 to 9:1, or 1:10 to 9:1, or 1:10 to 8:1, or 1:10 to 7:1, or 1:10 to 6:1, or 1:10 to 5:1, or 1:10 to 4:1, or 1:10 to 3:1, or 1:10 to 2:1, or 1:10 to 1:1, or 1:9 to 9:1, or 1:8 to 8:1, or 1:7 to 7:1, or 1:6 to 6:1, or 1:5 to 5:1, or 1:4 to 4:1, or 1:3 to 3:1, or 1:2 to 2:1, or 1:1, or about 1:1. In embodiments, the heating is heating to a temperature sufficient to melt one or more of the contacted components. In embodiments, the heating is heating to a temperature of about 60° C. to 150° C., or about 60° C. to 120° C., or about 60° C. to 100° C. In some embodiments the contacting further includes adding a solvent while in other embodiments the contacting is neat. In some embodiments, the heating is continued for a period of about 1 minute to about 12 hours, or about 10 minutes to 10 hours, or about 30 minutes to 5 hours. In embodiments the heating is continued until one or more reaction products are detected.

Once the TOFAm-P is formed, it is contacted with thioglycolic acid, 2-mercaptoethanol, sodium thiosulfate, or a combination of two or more thereof in a molar ratio of 10:1 to 1:10; and heating the combination to form a S-TOFAm-P, that is, the second S-TO. In embodiments, the molar ratio of TOFAm-P to sulfur contacted is 1:10 to 10:1, or 1:9 to 10:1, or 1:8 to 10:1, or 1:7 to 10:1, or 1:6 to 10:1, or 1:5 to 10:1, or 1:4 to 10:1, or 1:3 to 10:1, or 1:2 to 10:1, or 1:1 to 10:1, or 1:10 to 9:1, or 1:10 to 9:1, or 1:10 to 8:1, or 1:10 to 7:1, or 1:10 to 6:1, or 1:10 to 5:1, or 1:10 to 4:1, or 1:10 to 3:1, or 1:10 to 2:1, or 1:10 to 1:1, or 1:9 to 9:1, or 1:8 to 8:1, or 1:7 to 7:1, or 1:6 to 6:1, or 1:5 to 5:1, or 1:4 to 4:1, or 1:3 to 3:1, or 1:2 to 2:1, or 1:1, or about 1:1. In embodiments, the heating is heating to a temperature sufficient to melt one or more of the contacted components. In embodiments, the heating is heating to a temperature of about 60° C. to 150° C., or about 60° C. to 120° C., or about 60° C. to 100° C. In some embodiments the contacting further includes adding a solvent while in other embodiments the contacting is neat. In some embodiments, the heating is continued for a period of about 1 minute to about 12 hours, or about 10 minutes to 10 hours, or about 30 minutes to 5 hours. In embodiments the heating is continued until one or more reaction products are detected, or until the reaction between the components is sufficient to provide optimal anti-corrosion activity of the second S-TO, as determined by the operator and further by optimization of reaction products for one or more specific containments, specific corrodents, or specific water sources, or a combination thereof.

In embodiments, S-TOFAm-P is a mixture of TOFAm-P with thioglycolic acid, 2-mercaptoethanol, sodium thiosulfate, or a combination of two or more thereof. In other embodiments, the S-TOFAm-P is a reaction product of a TOFAm-P with thioglycolic acid, 2-mercaptoethanol, sodium thiosulfate, or a combination of two or more thereof. In still other embodiments, the S-TOFAm-P is a mixture of TOFAm-P, one or more of thioglycolic acid, 2-mercaptoethanol, and sodium thiosulfate; and one or more reaction products of a TOFAm, TOFAm-OH, or a mixture thereof with thioglycolic acid, 2-mercaptoethanol, sodium thiosulfate, phosphoric acid, one or more phosphate esters, or a combination of two or more of these.

S-TO Concentrates

The S-TO are suitably stored neat, that is, without solvent or any additives. When stored neat, the S-TO are storage stable for at least one year, at least five years, or at least 10 years. However, to facilitate rapid mixing of the S-TO with a water source and further to facilitate pouring, pumping, or other manipulation of the S-TO to deliver it to a water source in need of corrosion inhibition, in embodiments the S-TO is an S-TO concentrate.

S-TO concentrates are compositions including about 1 wt % to 90 wt % of one or more S-TO and one or more solvents. Solvents are compounds that do not react with the S-TO to form any covalent bonds, and are substantially liquid at temperatures at least in the range of 0° C. to 100° C. at atmospheric pressure. It is an advantage of the S-TO compositions that they are easily dispersed or dissolved in one or more solvents to form an S-TO concentrate, and that the resulting concentrates are storage stable.

Solvents useful in conjunction with the S-TO concentrates include $C_1$-$C_6$ alkanols, alkoxyalkanols, glycols, and mixtures of two or more such solvents in any ratio. The S-TO concentrates comprise at least about 1 wt % S-TO and up to about 90 wt % S-TO, for example about 1 wt % to 80 wt %, or about 1 wt % to 70 wt %, or about 1 wt % to 60 wt %, or about 1 wt % to 50 wt %, or about 1 wt % to 40 wt %, or about 1 wt % to 30 wt %, or about 1 wt % to 20 wt %, or about 1 wt % to 10 wt %, or about 3 wt % to 90 wt %, or about 5 wt % to 90 wt %, or about 10 wt % to 90 wt %, or about 15 wt % to 90 wt %, or about 20 wt % to 90 wt %, or about 25 wt % to 90 wt %, or about 30 wt % to 90 wt %, or about 3 wt % to 30 wt %, or about 3 wt % to 20 wt %, or about 5 wt % to 25 wt %, or about 5 wt % to 15 wt % S-TO by weight of the S-TO concentrate.

In some embodiments the S-TO concentrates include two or more S-TO. In embodiments, the S-TO concentrate includes a mixture of S-TOFAm and S-TOFAm-P. The S-TO concentrates are stable under standard storage conditions for at least 24 hours and up to five years: that is, the concentrates are storage stable. Additionally, during storage of the S-TO concentrates under standard storage conditions, $H_2S$ is not measurably released. This is true even though thioglycolic acid, 2-mercaptoethanol and sodium thiosulfate are all associated with formation of $H_2S$ during storage in an enclosed container.

Further, the S-TO are suitably stored neat, and the neat S-TO are storage stable as determined by storing the S-TO neat under standard storage conditions, followed by headspace analysis of the storage containers. For example, in embodiments where the S-TO is stored neat, no $H_2S$ is detected after 500 hours of storage at 50° C.

In embodiments, the S-TO concentrates include one or more additives. In embodiments, the additives are added to the S-TO concentrate to provide a benefit to a water source, a treated metal containment, or both. Non-limiting examples of such benefits include stabilization against phase separation; pH adjustment; and ease and completeness of mixing when the S-TO concentrate is combined with the water source.

Suitable additives include alicyclic, aromatic, or aralkyl amines having 6 to 30 carbons, and including e.g. triazine, pyridine and substituted pyridines; aliphatic and alicyclic amides; imidazoline; quaternary ammonium surfactants having an HLB greater than about 9; phosphate esters such as $C_2$-$C_{16}$ or $C_8$-$C_{10}$ alkyl phosphate esters including e.g. di-2-ethylhexyl phosphate (di-2-ethylhexyl phosphoric acid), dinonylphosphate, didecylphosphate, mixed phosphate esters, and the like, ethoxylated $C_1$-$C_{12}$ or $C_8$-$C_{10}$ alkylphenol phosphate esters, or other organophosphate esters having a total of 2 to 30 carbons; quinoline, salts thereof, and quaternized derivatives thereof with $C_1$-$C_{30}$ alkyl halides; water soluble polymers such as polyethylene oxide and copolymers thereof; derivatives of carboxylic acids having 6 to 30 carbons, such as salts or alkanol esters of $C_1$-$C_{30}$ organic acids; and mono- or polyunsaturated long-chain acids derived from sources comprising, consisting essentially of, or consisting of TOFA, coconut oil, canola oil, palm seed oil, and the like obtained as a by-product of the Kraft process of wood pulp manufacture, principally from pulping coniferous trees. Blends of two or more of the foregoing additives are also suitably employed in the S-TO concentrates.

Each additive and amount of the additive is selected individually by a user for addition to the S-TO concentrate; the amounts of additives are not particularly limited. However, in embodiments, a selected additive is present in the S-TO concentrate in an amount of 10 wt % or less based on the weight of the S-TO present in the S-TO concentrate. For example, an additive is present in the S-TO concentrate in an amount of about 10 wt % to 0.0001 wt % based on the weight of the S-TO, or about 10 wt % to 0.001 wt %, or about 10 wt % to 0.01 wt %, or about 10 wt % to 0.1 wt %, or about 10 wt % to 1 wt %, or about 0.001 wt % to 5 wt %, or about 0.001 wt % to 4 wt %, or about 0.001 wt % to 3 wt %, or about 0.001 wt % to 2 wt %, or about 0.001 wt % to 1 wt % based on the weight of the S-TO present in the S-TO concentrate. The amount of additive is selected by the user to obtain optimized storage stability of the S-TO concentrate, optimized mixing of the S-TO concentrate with a water source, optimized performance of the S-TO in terms of corrosion inhibition, mixing, stability, or another factor.

The S-TO concentrates are suitably stored within enclosed containers at temperatures of about −60° C. to 100° C., such as about −50° C. to 80° C., or about −40° C. to 70° C., or about −20° C. to 50° C., or about −10° C. to 50° C. for a storage period of about 1 day (24 hours) to 5 years, for example about 1 day to 2 years, or about 1 week to 2 years, or about 1 month to 2 years, or about 6 months to 2 years, or about 1 year to 2 years, or about 1 month to 1 year. During the storage, no special steps or treatments are required to stabilize or mitigate degradation within the S-TO concentrates.

Accordingly, disclosed herein is a method of storing an S-TO composition, the method comprising combining 1 wt % to 90 wt % of one or more S-TO with one or more $C_1$-$C_6$ alkanols, alkoxyalkanols, glycols, glycol ethers, and mixtures of two or more such solvents in any ratio to form an S-TO concentrate, optionally adding 10 wt % to 0.0001 wt % of one or more additives to the S-TO concentrate, and storing the S-TO concentrate in an enclosed container for at least 24 hours and as long as five years. In some embodiments the storage is between 0° C. and 100° C. During storage of the S-TO concentrates, $H_2S$ is not measurably released, as determined by headspace analysis of the storage containers during the storage period.

In embodiments, the container employed to store the S-TO concentrate is a discrete article having an interior volume and means to enclose a liquid therein, wherein "enclose" means substantially isolate the liquid from the ambient atmosphere and from fluid communication. In embodiments, the container includes one or more caps, valves, lids, covers, plugs, stoppers, doors, or other means known to those of skill to enable enclosing a liquid within the interior volume and also to enable subsequent removal of some or all of the liquid enclosed therein. In embodiments, the interior volume of the container enclosing the liquid includes a headspace volume comprising air.

The container used to enclose the S-TO concentrate is not particularly limited in terms of materials, shape, or size and is selected by the user for convenience of storing the container during a storage period. In various embodiments the stabilized concentrates are stored within a container comprising one or more materials that are stable to aqueous solutions; such materials include but are not limited to glass, a polyamide, a metal, polyethylene terephthalate (PET), a polystyrene, an acrylonitrile-butadiene-styrene (ABS) terpolymer, or a polyolefin such as polyethylene, polypropylene, and copolymers thereof including copolymers with α-olefins such as octene and hexene. The container is suitably in the form of bottles, jars, carboys, tanks, railroad cars, drums, and the like. The containers generally include means to periodically and temporarily open the otherwise enclosed container; such means include but are not limited to screw caps, valves, snap caps, fitted corks, fitted lids secured by pressure from e.g. clamps, clips, brackets; and the like.

Containers useful for storing the S-TO concentrates are substantially enclosed: that is, the container is substantially isolated from the atmosphere. Substantial isolation means that the container is isolated from the atmosphere during the storage period but may be periodically and temporarily opened during the storage period, for example to remove an aliquot of the composition for application to a water source within a metal containment. It is a feature of the S-TO concentrates that no $H_2S$ is detectable in the headspace of such containers during the storage period, when the detection is carried out using common quantitative techniques such as use of DRAEGER-TUBES® or GASTEC® tubes for headspace measurements. The enclosed containers containing the S-TO concentrates are suitably opened periodically and temporarily throughout the storage period, wherein no $H_2S$ is detected within the container, e.g. in the headspace above the stabilized concentrate during any one or more such openings. Thus, the enclosed storage containers may be defined as "substantially enclosed containers" wherein "substantially" indicates that the containers containing the stabilized concentrates are enclosed during the storage period but are suitably opened periodically and temporarily throughout the storage period.

Treated Water Sources and Metal Containments

Disclosed herein are treated water sources, wherein the treated water source is a water source including one or more corrodents and about 0.5 ppm to 500 ppm by weight or by volume of one or more S-TO. In embodiments, the water source is a produced water. Also disclosed herein are treated metal containments comprising a treated water source. The treated water source is disposed within the metal containment and in contact with a surface thereof or portion of a surface thereof. The treated water source includes one or more corrodents and about 0.5 ppm to 500 ppm by weight or by volume of one or more S-TO, based on the weight of the water source. A metal containment is a tank, pipe, or other apparatus having a metal surface or portion thereof in contact with a water source, wherein the water source includes one or more corrodents; corrodents include but are not limited to hydrogen sulfide, carbon dioxide, oxygen, sodium chloride, calcium chloride, and sulfur dioxide. In embodiments the metal containment is enclosed. In other embodiments the metal containment is exposed to the environment, is in fluid communication with one or more other devices or metal containments, or both exposed to the environment and in fluid communication with one or more other devices or containments.

A treated metal containment is a metal containment comprising a treated water source. A treated water source is a water source comprising one or more corrodents and about 0.5 ppm to 500 ppm of an S-TO, wherein the amount is by weight or by volume. In embodiments the treated water source comprises one or more S-TO, wherein the total S-TO concentration by volume in the treated water source is about 1 ppm to 500 ppm, or about 5 ppm to 500 ppm, or about 10 ppm to 500 ppm, or about 15 ppm to 500 ppm, or about 20 ppm to 500 ppm, or about 25 ppm to 500 ppm, or about 30 ppm to 500 ppm, or about 35 ppm to 500 ppm, or about 40 ppm to 500 ppm, or about 45 ppm to 500 ppm, or about 50 ppm to 500 ppm, or about 60 ppm to 500 ppm, or about 70 ppm to 500 ppm, or about 80 ppm to 500 ppm, or about 90 ppm to 500 ppm, or about 100 ppm to 500 ppm, or about 0.5 ppm to 400 ppm, or about 0.5 ppm to 300 ppm, or about 0.5 ppm to 200 ppm, or about 0.5 ppm to 100 ppm, or about 0.5 ppm to 90 ppm, or about 0.5 ppm to 80 ppm, or about 0.5 ppm to 70 ppm, or about 0.5 ppm to 60 ppm, or about 0.5 ppm to 50 ppm, or about 0.5 ppm to 40 ppm, or about 0.5 ppm to 30 ppm, or about 0.5 ppm to 25 ppm, or about 0.5 ppm to 20 ppm, or about 0.5 ppm to 15 ppm, or about 0.5 ppm to 10 ppm, or about 0.5 ppm to 5 ppm, or about 1 ppm to 100 ppm, or about 5 ppm to 75 ppm, or about 5 ppm to 50 ppm, or about 10 ppm to 50 ppm of an S-TO by volume in the treated water source. In other embodiments, the foregoing amounts are provided by weight and not by volume.

The S-TO inhibit corrosion of the metal surface or portion thereof of the metal containment when contacted by the treated water source. In embodiments, the S-TO inhibit corrosion of the metal surface more effectively than a conventional sulfur-based corrosion inhibitor. That is, the S-TO are more effective, on a weight basis or on a volume basis, at inhibiting corrosion than thioglycolic acid, 2-mercaptoethanol, or sodium thiosulfate. In embodiments, the S-TO inhibit corrosion of the metal surface as effectively as a conventional sulfur-based corrosion inhibitor. That is, the S-TO are as effective, on a weight basis or on a volume basis, at inhibiting corrosion as thioglycolic acid, 2-mercaptoethanol, or sodium thiosulfate.

For example, when added to produced water at 5 ppm by volume, the S-TO compositions are more effective than thioglycolic acid at inhibiting corrosion of a carbon steel surface. In embodiments, the S-TO reduce corrosion 25% to 500% more than the same volume of thioglycolic acid in the same water source and over the same period of time, for example about 50% to 400%, or about 50% to 300%, or about 50% to 200%, or about 75% to 500%, or about 75% to 400%, or about 75% to 300%, or about 75% to 200%, or about 100% to 500%, or about 100% to 400%, or about 100% to 300%, or about 100% to 200% more than the same volume of thioglycolic acid in the same water source and over the same period of time. In embodiments the period of time is at least 2 hours, at least 4 hours, or at least 8 hours. In embodiments the period of time is up to 10 years.

For example, a water source comprising a sufficient concentration of corrodents such that the untreated water source corrodes a carbon steel, for example a stainless steel, at a rate of about 400 to 500 milli-inches per year (mpy), exhibits a reduced rate of corrosion when 5 ppm by volume of a conventional sulfur-based corrosion inhibitor is applied thereto, for example about 150 mpy to 200 mpy. However, an S-TO applied to the same water source at 5 ppm by volume results in a rate of corrosion of less than 100 mpy. Such a result is unexpected to one of ordinary skill, because the S-TO compositions have less sulfur content on a weight basis than conventional sulfur-based corrosion inhibitors such as thioglycolic acid, 2-mercaptoethanol, or sodium thiosulfate and one of skill would expect such compositions to be less effective on a volumetric basis or on a weight basis as a result.

Further, since the S-TO compositions do not degrade to form $H_2S$ during storage, after a period of storage more corrosion inhibiting compound is present in a container including an S-TO concentrate than is present in a conventional sulfur-based corrosion inhibitor stored at the same concentration and for the same period of time and under the same storage conditions. Even further, the S-TO may also be stored neat, that is, substantially at 100% solids. Such storage reduces the volume required to store the S-TO; the neat S-TO also do not degrade to form $H_2S$. For all these reasons the S-TO are more effective, after a period of storage, than conventional sulfur-based corrosion inhibitors. Conventional sulfur-based inhibitors include 2-mercaptoethanol, thioglycol, and sodium thiosulfate. Such a period of storage is, in embodiments, about 1 day to 5 years, or about 1 day to 2 years, or about 5 days to 5 years, or about 7 days to 5 years, or about 15 days to 5 years, or about 30 days to 5 years, or about 60 days to 5 years, or about 90 days to 5 years, or about 180 days to 5 years, or about 1 year to 5 years, or about 1 year to 2 years.

In embodiments, the water source is an industrial water source, such as a produced water. In embodiments, the water source is a wastewater from an industrial process. In embodiments the one or more corrodents present in the water source include $H_2S$. In embodiments, the metal surface or portion thereof in contact with the water source includes a carbon steel. In embodiments, the metal surface or portion thereof in contact with the water source includes a carbon steel. In embodiments the carbon steel is stainless steel. In embodiments, the water source is a continuously flowing water source, such as produced water flowing from a subterranean reservoir and into or through a pipe or tank, or wastewater isolated from a continuous manufacturing process flowing into a wastewater treatment apparatus. In other embodiments, the water source is a batch, or plug, substantially disposed in a batchwise or static state within the metal containment.

At any point in the storage, conveyance, treatment, discharge, disposal, or any other process in which a water source is contacted with a metal containment surface, about 0.5 ppm to 500 ppm of an S-TO composition by weight or by volume is advantageously applied to the water source to inhibit corrosion of the metal containment surface.

The metal containment is any type of containment comprising one or more metal surfaces for contacting a water source containing one or more corrodents. In some embodiments, the metal containment or a contact surface thereof comprises, consists of, or consists essentially of steel. In some embodiments, the steel comprises, consists of, or consists essentially of carbon steel. In some embodiments, the metal containment or a contact surface thereof comprises, consists of, or consists essentially of iron. In some embodiments, the metal containment or a contact surface thereof comprises or consists essentially of aluminum, zinc, chromium, manganese, nickel, tungsten, molybdenum, titanium, vanadium, cobalt, niobium, copper, or mixtures thereof.

In some embodiments, the metal containment or a contact surface thereof comprises or consists essentially of metal and one or more of boron, phosphorus, sulfur, silicon, oxygen, nitrogen, and/or mixtures thereof. In some embodiments, the metal containment comprises, consists of, or consists essentially of a pipe. In some embodiments, the pipe is coiled tubing. In some embodiments, the pipe has a device attached thereto, the device or a contact surface thereof comprising, consisting of, or consisting essentially of metal. In some embodiments the device is a pressure gauge, a flowmeter, a chemical sensor, or a pump. In some embodiments, the metal containment comprises, consists of, or consists essentially of a tank. In some embodiments, the tank is enclosed and thus the contents of the tank are not open to the atmosphere. In some embodiments, the contents of the enclosed tank are at a pressure that is higher than the ambient environmental air pressure. In some embodiments, the contents of the sealed tank are at a pressure that is lower than the ambient environmental air pressure external to the tank. In some embodiments, the tank is open to the air and the contents are at ambient environmental air pressure. In some embodiments, the tank has an inflow and/or an outflow pipe attached thereto. In some embodiments, the tank has a device attached thereto, such as a pump, flowmeter, chemical sensor, pressure gauge, or metal drill pipe. In some embodiments, the metal containment is a railroad tank car, also known as an "oil can" rail car. In some embodiments, the metal containment is a tank truck, sometimes known as a tanker.

Steel is an alloy comprising, consisting of, or consisting essentially of iron and carbon. Typically, the carbon content of steel is between 0.002% and 2.1% by weight. In some embodiments, the steel comprises between about 0.002% and 2.1% of carbon by weight. In some embodiments, the steel additionally comprises manganese, chromium, nickel, tungsten, molybdenum, boron, titanium, vanadium, cobalt, niobium, phosphorus, sulfur, silicon, oxygen, nitrogen, or copper, or mixtures thereof. In some embodiments, the steel comprises iron sulfide, ferrous oxide (iron (II) oxide), ferric oxide (iron (III) oxide), iron (II,III) oxide, hydrated iron oxides such as $Fe_2O_3 \cdot nH_2O$ where n is a number between 0.1 and 3, $Fe(OH)_3$, and/or $FeO(OH)$. In some embodiments, the steel is pre-corroded and contains, comprises, or has a surface coating comprising rust, oxide, hydroxide, oxide-hydroxide, sulfide, chloride, sulfate, nitrate, carbonate, sulfite, nitrite, phosphate, or mixtures thereof.

Carbon steel is steel in which the main alloying component is carbon, wherein the carbon steel comprises between about 0.1% to about 2.1% by weight of carbon. In one embodiment, the carbon steel comprises between 0.1% and 2.1% by weight of carbon. In one embodiment, the carbon steel comprises between 0.1% and 2.0% by weight of carbon. In one embodiment, the carbon steel comprises between 0.12% and 2.0% by weight of carbon. In one embodiment, the carbon steel comprises between 0.15% and 2.0% by weight of carbon. In one embodiment, the carbon steel comprises between 0.17% and 2.0% by weight of carbon. In one embodiment, the carbon steel comprises between 0.12% and 0.18% by weight of carbon. In one embodiment, the carbon steel comprises between 0.12% and 0.15% by weight of carbon. In one embodiment, the carbon steel comprises 0.18% by weight of carbon.

In embodiments, a method of inhibiting corrosion of a metal containment surface comprises or consists essentially of applying an S-TO to one or more water sources to form a treated water source, and contacting the treated water source with a metal containment surface or portion thereof. In embodiments the applying is applying about 0.5 ppm to 500 ppm (by weight or by volume) of one or more S-TO to the water source to form a treated water source. In embodiments, the S-TO is provided neat, and the method further includes melting the neat S-TO before applying the molten S-TO to the water source to form a treated water source. In embodiments, the S-TO is provided neat and the method further includes dissolving or dispersing the S-TO with a water-soluble solvent before applying the S-TO to the water source to form the treated water source. In embodiments, the S-TO is provided as an S-TO concentrate. In embodiments the method includes applying an S-TO concentrate directly to the metal containment in an amount that results in 0.5 ppm to 500 ppm by weight or by volume of the S-TO in the water source. In other embodiments the method further includes diluting an S-TO concentrate prior to the applying. The diluting comprises, consists essentially of, or consists of combining an S-TO concentrate with a diluent, wherein the diluent comprises, consists essentially of, or consists of water, a water source, a water soluble solvent, or a mixture of two or more thereof; and optionally includes mixing the S-TO concentrate with the diluent.

In embodiments, the applying comprises, consists essentially of, or consists of dripping, pouring, spraying, pumping, injecting, or otherwise adding an S-TO composition to the metal containment, or to a water source that subsequently contacts a metal surface or portion thereof in the metal containment. In some embodiments, the applying is batchwise; in other embodiments the applying is continuous. In some embodiments, the method of corrosion inhibition further comprises storing an S-TO concentrate in a container for a storage period before the applying. In such embodiments, the S-TO concentrate is characterized by a lack of $H_2S$ present in the headspace of the container after the storage period. In some embodiments the method of corrosion inhibition further comprises storing the S-TO composition neat prior to the combining and applying.

In embodiments, the water source is selected from the group consisting of produced water, injectate, effluent from mining, and effluent from paper production. In embodiments, the water source is a high total dissolved solids water source; a high temperature water source; or a high total dissolved solids, high temperature water source. As used herein, "high temperature" means temperature in excess of about 60° C. and as high as about 200° C. As used herein, "high total dissolved solids" means about 5 wt % or more non-polymeric solids are dissolved in the water source. In some embodiments where the water source includes high total dissolved solids, a substantial portion of the total dissolved solids (that is, more than 50% by weight) are ionic compounds. High total dissolved solids water sources include about 5 wt % to 35 wt %, or about 5 wt % to 32 wt %, or about 5 wt % to 30 wt %, or about 5 wt % to 28 wt %, or about 5 wt % to 26 wt %, or about 5 wt % to 24 wt %, or about 5 wt % to 22 wt %, or about 5 wt % to 20 wt %, or about 6 wt % to 35 wt %, or about 7 wt % to 35 wt %, or about 8 wt % to 35 wt %, or about 9 wt % to 35 wt %, or about 10 wt % to 35 wt %, or about 12 wt % to 35 wt %, or about 14 wt % to 35 wt %, or about 16 wt % to 35 wt %, or about 18 wt % to 35 wt %, or about 20 wt % to 35 wt %, or about 22 wt % to 35 wt %, or about 25 wt % to 35 wt %, or about 10 wt % to 32 wt %, or about 10 wt % to 30 wt %, or about 10 wt % to 28 wt %, or about 10 wt % to 26 wt %, or about 10 wt % to 24 wt %, or about 10 wt % to 22 wt %, or about 10 wt % to 20 wt % non-polymeric solids. In some embodiments, the non-polymeric solids are corrodents. In some embodiments, the non-polymeric solids comprise corrodents. In some embodiments, the water source is produced water, brackish water, or sea water.

In some embodiments, the water source comprises, consists essentially of, or consists of produced water, injectate, seawater, municipal water, wastewater such as runoff water, "gray" water, municipal waste water, treated or partially treated waste water, brackish water, sea water, connate, groundwater, wastewater discharge from a pulp or paper mill, waste from mining such as "tailings", red mud from aluminum mining and processing, yellow boy, acid mine drainage, or a combination of two or more such water sources as determined by context. In some embodiments, the water source comprises 85000 ppm Cl or more. In some embodiments, the water source comprises from 300 to 18000 ppm by weight of Cl. In some embodiments, the water source comprises between 10000 and 100000 ppm of Cl. In some embodiments, the water source comprises between 50000 and 200000 ppm based on weight.

In some embodiments, the water source comprises water and one or more corrodents, wherein the one or more corrodents comprises, consists essentially of, or consists of metal cations, metal complexes such as aqueous metal cations, metal chelates and/or organometallic complexes, aluminum ions, ammonium ions, barium ions, chromium ions, cobalt ions, cuprous ions, cupric ions, calcium ions, ferrous ions, ferric ions, hydrogen ions, magnesium ions, manganese ions, molybdenum ions, nickel ions, potassium ions, sodium ions, strontium ions, titanium ions, uranium ions, vanadium ions, zinc ions, bromide ions, carbonate ions, chlorate ions, chloride ions, chlorite ions, dithionate ions, fluoride ions, hypochlorite ions, iodide ions, nitrate ions, nitrite ions, oxide ions, perchlorate ions, peroxide ions, phosphate ions, phosphite ions, sulfate ions, sulfide ions, sulfite ions, hydrogen carbonate ions, hydrogen phosphate ions, hydrogen phosphite ions, hydrogen sulfate ions, hydrogen sulfite ions, carbonic acid, hydrochloric acid, nitric acid, sulfuric acid, nitrous acid, sulfurous acid, peroxy acids, phosphoric acid, ammonia, bromine, carbon dioxide, chlorine, chlorine dioxide, fluorine, hydrogen chloride, hydrogen sulfide, iodine, nitrogen dioxide, nitrogen monoxide, oxygen, ozone, sulfur dioxide, hydrogen peroxide, polysaccharide, or combinations thereof.

In some embodiments, the one or more corrodents comprises, consists of, or consists essentially of insoluble particulates such as metal oxides, sands, clays, silicon dioxide, titanium dioxide, muds, and other insoluble inorganic and/or organic particulates, which in some embodiments act as abrasives when entrained in a water flow contacting a metal.

In some embodiments, the one or more corrodents comprises, consists of, or consists essentially of an oxidizing agent. In some embodiments, the corrodent comprises, consists of, or consists essentially of a chelating agent. In some embodiments, the corrodent comprises an alcohol. In some embodiments, the corrodent comprises an organochlorine compound. In some embodiments, the one or more corrodents comprises, consists of, or consists essentially of an acid. In some embodiments, the one or more corrodents comprises, consists of, or consists essentially of an alkali.

In some embodiments, the pH of the water source is less than 7. In some embodiments, the pH of the water source is between about 1 and about 6. In some embodiments, the pH of the water source is between 5 and 6. In some embodiments, the pH of the water source is between 4 and 5. In some embodiments, the pH of the water source is between 3 and 4. In some embodiments, the pH of the water source is between 2 and 3. In some embodiments, the pH of the water source is between 1 and 2. In some embodiments, the pH of the water source is between 0 and 1. In some embodiments, the pH of the water source is between 7 and 14. In some embodiments, the pH of the water source is between 8 and 14. In some embodiments, the pH of the water source is between 9 and 14. In some embodiments, the pH of the water source is between 10 and 14. In some embodiments, the pH of the water source is between 11 and 14. In some embodiments, the pH of the water source is between 12 and 14. In some embodiments, the pH of the water source is between 13 and 14. In some embodiments, the pH of the water source is between 7 and 8. In some embodiments, the pH of the water source is between 7 and 9. In some embodiments, the pH of the water source is between 7 and 10. In some embodiments, the pH of the water source is between 7 and 11. In some embodiments, the pH of the water source is between 7 and 12. In some embodiments, the pH of the water source is between 7 and 13. In some embodiments, the pH of the water source is between 8 and 13. In some embodiments, the pH of the water source is between 9 and 12. In some embodiments, the pH of the water source is between 10 and 11.

In some embodiments, the water source comprises, consists essentially of, or consists of produced water; injectate; connate; industrial wastewater; an aqueous mixture comprising sodium hydroxide and sodium sulfide ("white liquor"); an aqueous mixture comprising lignin, one or more carbohydrates, sodium carbonate, sodium sulfate, and/or one or more other salts ("black liquor"); municipal waste water, treated or partially treated waste water; sea water; or a combination of two or more such water sources as determined by context. In some embodiments, the water source includes one or more salts, ions, buffers, acids, bases, surfactants, or other dissolved, dispersed, or emulsified compounds, materials, components, or combinations thereof. In some embodiments, a water source includes about 0 wt % to 35 wt % total dissolved solids. In some such embodiments, the total dissolved solids are substantially non-polymeric solids. In some such embodiments, the dissolved solids comprise, consist of, or consist essentially of ionic compounds. In some embodiments, the water source to which the corrosion inhibitor is applied to produce the corrosion inhibitor composition is sea water, brackish water, produced water, one or more additional water sources, or combinations thereof. In some such embodiments, the additional water source includes 300 ppm or more of one or more ions. In some embodiments, the water source for the corrosion inhibitor composition contains one more of the following: about 300 ppm or more of Ca, for example 500 ppm or more or even 3000 ppm or more of Ca; about 1100 ppm or more of Mg; about 300 ppm or more of Ba, for example about 500 ppm or more of Ba.

In some embodiments, the water source comprises, consists of, or consists essentially of brackish water. In some embodiments, the water source comprises, consists of, or consists essentially of seawater. In some embodiments, the water source comprises, consists of, or consists essentially of produced water. In some embodiments, the water source comprises 100 to 20000 ppm of Cl, based on weight. In some embodiments, the water source comprises 20000 to 25000 ppm of Cl, based on weight. In some embodiments, the water source comprises 10000 to 100000 ppm of Cl, based on weight. In some embodiments, the water source comprises 25000 to 200000 ppm of Cl, based on weight. In embodiments, the Cl is present as chloride ions. Useful water sources for the invention comprise, consist of, or consist essentially of produced water, injectate, or mixtures thereof.

In embodiments, the water source includes one or more salts, polymers, surfactants, scale inhibitors, stabilizers, metal chelating agents, corrosion inhibitors, paraffin inhibitors, and other additives as determined by the operator in a subterranean hydrocarbon recovery process or another industrial process. In some embodiments, the water source comprises, consists of, or consists essentially of injectate, connate, produced water, sea water, brackish water, or brine. In some embodiments, an injectate comprises one or more of connate, produced water, sea water, brackish water, or brine. In embodiments where an injectate comprises produced water, the injectate is also termed "recycled produced water." In some embodiments, the water source further comprises minor (<50 wt %) amounts of residual hydrocarbon products entrained therein and additionally. In some embodiments, produced water additionally comprises one or more surfactants, solvents, coupling agents, emulsifying agents (emulsifiers), demulsifying agents (demulsifiers), paraffin wax inhibitors, and mixtures of two or more thereof.

Having described the invention in detail, it will be apparent that modifications and variations are possible without departing from the scope of the invention defined in the appended claims.

EXPERIMENTAL

Example 1

Tall oil fatty acid (TOFA) was combined with 2-(2-aminoethylamino)ethanol, $H_2N-CH_2-CH_2-NH-CH_2-CH_2-OH$ (104.15 g/mol) in a 1:1 molar ratio based on the manufacturer's reported molecular weight of TOFA of 280 g/mol. The combination resulted in formation of a tall oil fatty amide (TOFAm) product. The completed reaction was as verified by FTIR. The TOFAm reaction product was calculated to have a molecular weight of 366 g/mol based on the manufacturer's reported molecular weight of TOFA.

A 250 mL flask was charged with 73.20 g of the TOFAm reaction product, and the contents of the flask were heated to 65-70° C. with stirring. Then 15.64 g 2-mercaptoethanol (78.20 g/mol) was added slowly to the flask; heating and stirring was continued for another two hours. Then the heat was shut off and the reaction product (Product 1) was poured out while warm.

Example 2

A 250 mL flask was charged with 73.20 g of the TOFAm reaction product of Example 1, and the contents of the flask were heated to 65-70° C. with stirring. Then 15.64 g 2-mercaptoethanol (78.20 g/mol) was added slowly to the flask; heating and stirring was continued for another two hours. Then 23.00 g phosphoric acid (85%) was slowly added to the flask with stirring. After the addition was complete, the contents of the flask were heated to 120° C. with stirring, and this temperature was maintained for another two hours with stirring. Then the heat was shut off and the resulting product (Product 2) was poured out while hot. Product 2 was observed to be partially water soluble when cooled to ambient temperature.

Example 3

Figure 2:
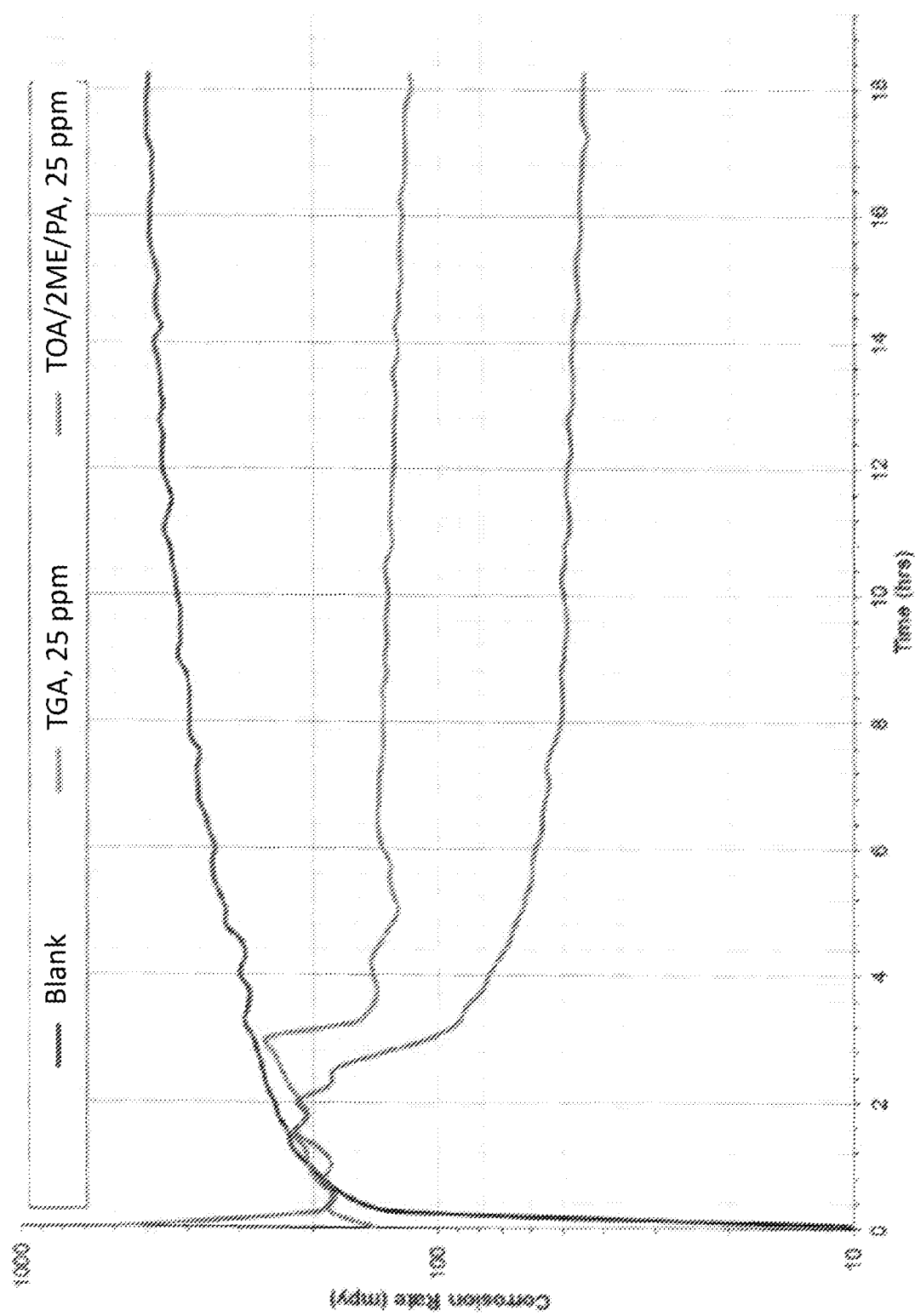
FIG. 2 is a plot of corrosion in milli-inches per year as a function of time for another composition described herein.

Products 1 and 2 were subjected to corrosion inhibition testing using corrosion bubble cell tests. The bubble cell tests were performed using the general procedure set forth in Andreev, N. et al., *J. Corros. Scale Inhib.* 2013, 2(1), 17-19. Conditions used were C1018 carbon steel electrode; 80° C.; $CO_2$ saturated 3% NaCl in water; continuous $CO_2$ sparge; and atmospheric pressure. The brine was allowed to contact the C1018 carbon steel electrode for about 3 hours; then the test was started by adding 5 ppm by volume of a test material delivered from a 20 wt % solution in methanol to the test vessel. Corrosion inhibition results are expressed as milli-inches of steel lost (via corrosion) per year, or mpy, as a function of time. The test was carried out using Product 1, then repeated with thioglycolic acid (TGA), a sulfur-containing corrosion inhibitor species widely used in the industry. Finally, the test was repeated again with no corrosion inhibitor added (blank). FIG. 1 shows the comparison of corrosion rate of the uninhibited brine with brine containing 5 ppm by volume of Product 1, and the brine containing 5 ppm by volume of TGA. FIG. 2 shows the comparison of corrosion rate of the uninhibited brine with brine containing 5 ppm by volume of Product 2, and the brine containing 5 ppm TGA.

FIG. 1 shows that the corrosion rate in the uninhibited test was reduced from about 210 mpy to about 20 mpy using Product 1; that is, Product 1 provided 86% corrosion inhibition. The corrosion rate in the test employing TGA was reduced from about 230 mpy to about 120 mpy; that is, TGA provided 48% corrosion inhibition.

FIG. 2 shows that the corrosion rate in the uninhibited test was reduced from about 220 mpy to about 20 mpy using Product 2; that is, Product 2 provided 91% corrosion inhibition. The corrosion rate in the test employing TGA was reduced from about 230 mpy to about 120 mpy; that is, TGA provided 48% corrosion inhibition.

Example 4

A 237 ml glass container containing about 40 g of neat Product 2 was sealed and equilibrated at a temperature of 50° C. The container was opened periodically and the headspace analyzed for presence of $H_2S$ using GASTEC® tubes. After 471 hours stored at 50° C., no $H_2S$ was detected in the headspace.

What is claimed:

1. A sulfur-functional tall oil composition comprising a product formed by combining a tall oil fatty amide with 2 mercaptoethanol in a molar ratio of 10:1 to about 1:1 amide to sulfur, and heating the combination in the absence of solvent to a temperature of about 60° C. to 150° C. for a period of about 1 minute to 12 hours; wherein the tall oil fatty amide has the structure R—C(O)NH—R' wherein R is a tall oil fatty group and R' is a group including 1 to 4 carbon atoms.

2. The sulfur-functional tall oil composition of claim 1 wherein R' further comprises an hydroxyl moiety.

3. The sulfur-functional tall oil composition of claim 2 wherein after heating, the product is further combined with neat phosphoric acid and heated.

4. The sulfur-functional tall oil composition of claim 3 wherein the molar ratio of sulfur to phosphorus combined is about 1:1.

5. The sulfur-functional tall oil composition of claim 1 further comprising about 10 wt % to 99 wt % of a solvent added to the product after the heating, the solvent comprising a $C_1$-$C_6$ alkanol, an alkoxyalkanol, a glycol, a glycol ether, or a mixture of two or more thereof.

6. An enclosed container comprising a sulfur-functional tall oil composition of claim 5.

7. The enclosed container of claim 6, wherein the container comprises a temperature of about −40° C. to 70° C.

8. A method comprising storing the enclosed container of claim 6 for a storage period of about 1 day to 5 years.

9. The method of claim 8 wherein the temperature of the container during the storage period is about −40° C. to 70° C.

10. A method of inhibiting corrosion of a metal containment, the method comprising
   applying 0.5 ppm to 500 ppm by volume of a sulfur-functional tall oil composition of claim 1 to a water source comprising one or more corrodents to form a treated water source; and
   contacting the treated water source with a metal surface or portion thereof in a metal containment.

11. The method of claim 10 wherein the metal containment is a tank or a pipe.

12. The method of claim 10 wherein the metal surface comprises a carbon steel.

13. The method of claim 10 wherein the water source comprises produced water or wastewater from a manufacturing process.

* * * * *